United States Patent [19]

Ohmura et al.

[11] Patent Number: 4,682,873
[45] Date of Patent: Jul. 28, 1987

[54] PHOTOMETRIC DEVICE FOR CAMERA

[75] Inventors: Hiroshi Ohmura, Saitama; Tokuichi Tsunekawa, Kanagawa; Shyuichi Kiyohara, Kanagawa; Takashi Kawabata, Kanagawa, all of Japan

[73] Assignee: Canon Kabushiki Kaisha, Tokyo, Japan

[21] Appl. No.: 770,162

[22] Filed: Aug. 27, 1985

[30] Foreign Application Priority Data

Aug. 31, 1984 [JP] Japan ................................ 59-182155
Aug. 31, 1984 [JP] Japan ................................ 59-182161
Aug. 31, 1984 [JP] Japan ................................ 59-182162

[51] Int. Cl.⁴ ............................................ G03B 7/099
[52] U.S. Cl. ................................................. 354/478
[58] Field of Search ............... 354/476, 478, 406, 155, 354/219; 350/211 R

[56] References Cited

U.S. PATENT DOCUMENTS

| | | | |
|---|---|---|---|
| 2,305,576 | 12/1942 | Lamb | 250/211 R |
| 3,450,016 | 6/1969 | Yamada | 354/478 X |
| 3,620,147 | 11/1971 | Atako et al. | 354/478 X |
| 4,104,651 | 8/1978 | Matsumoto et al. | 354/406 X |
| 4,431,913 | 2/1984 | Sekimoto et al. | 250/211 R X |

Primary Examiner—William B. Perkey
Attorney, Agent, or Firm—Toren, McGeady and Goldberg

[57] ABSTRACT

A photometric device disposed in the optical path of a view finder of a camera includes a photometric element which includes a plurality of minute photo-electric conversion elements. Each of the minute photometric elements is formed by a minute transparent electrode, a minute photo-electric converter, a minute opaque electrode and a transparent substrate which are arranged in that order from the side of a photo-taking lens.

14 Claims, 20 Drawing Figures

BACK INCIDENT LIGHT
FROM VIEW FINDER

LIGHT FROM OBJECT

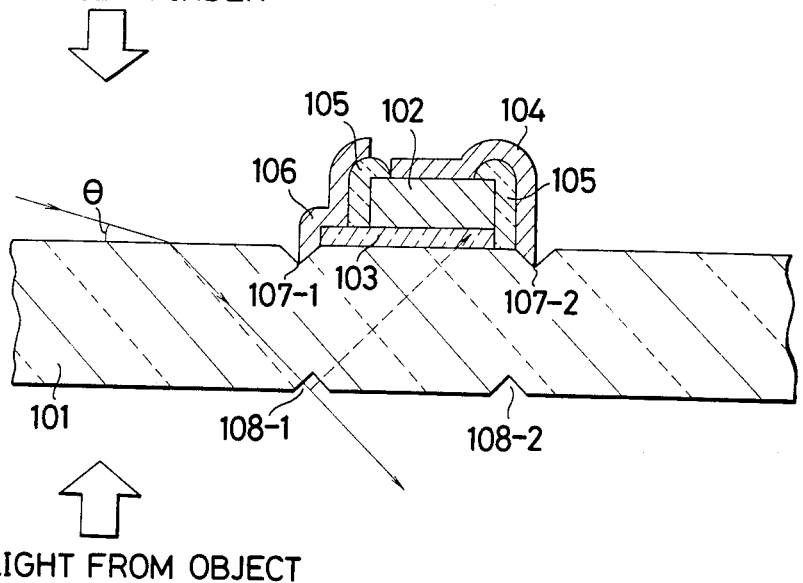
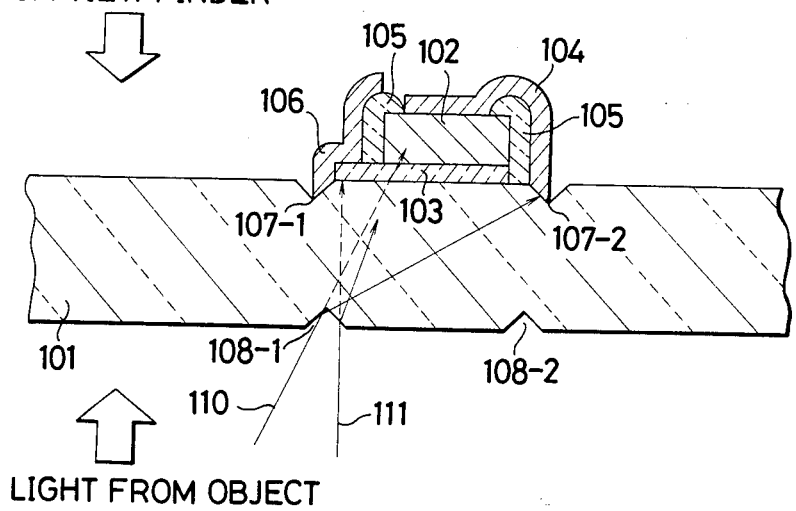

PHOTOMETRIC DEVICE FOR CAMERA

BACKGROUND OF THE INVENTION

1. Field of the Invention:

This invention relates to a photometric device for a camera arranged to measure light by means of a photometric element consisting of a plurality of minutes photo-electric conversion elements.

2. Description of the Prior Art:

Heretofore varied kinds of photometric devices have been proposed for single-lens reflex cameras. They include, for example, a device arranged to have a light flux guided to a photometric element by a light splitting member such as a micro beam splitter formed at a condenser lens and another device arranged to condense light via a Fresnel lens which is provided on a light flux exit surface of a pentagonal roof type prism. However, they have presented a problem that there is an excessively adverse effect of reversely incident light (hereinafter will be called a back incident light) which comes from a view finder.

FIGS. 1 and 2 of the accompanying drawings show examples of the above-stated conventional photometric devices. Referring to FIG. 1 which is a sectional view of the optical system of a single-lens reflex camera, a light flux coming from an object to be photographed passes through a photo-taking lens 1 and is reflected upward by a reflex mirror 2. The reflected light flux is split by a light splitting member 4 via a focusing plate 3 into a light flux incident on a photometric element 5 and another light flux coming to an eyepiece 8 via a condenser lens 6 and a pentagonal roof type prism 7. In this case, a back incident light which is an external light incident on the eyepiece 8 comes also to the photometric element 5 via the pentagonal roof type prism 7, the condenser lens 6 and the light splitting member 4. It has been thus hardly possible with this device to perform an accurate photometric operation.

In the case of the conventional device shown in FIG. 2, a light flux coming from an object through the photo-taking lens is reflected by a reflex mirror 2. The reflected light comes through a focusing screen 9 and then is refracted by a pentagonal roof type prism 7 before it reaches an eyepiece 8. According to this photometric arrangement, the incoming light flux is arranged to be condensed on a photometric element 5 by a Fresnel lens 10 which is provided on the exit surface of the prism 7 with the element 5 disposed in a position corresponding to the exit point of the lens 10. In the case of FIG. 2 also, a back incident light from a view finder, i.e. an external light incident on the eyepiece, is reflected by a reflex surface of the pentagonal roof type prism 7 toward the Fresnel lens 10 and thus comes to the photometric element 5. Therefore, it has been also impossible to accurately perform a photometric operation with that device.

Meanwhile, Japanese Laid-Open patent application No. SHO 58-168039 has disclosed a photometric device. In this instance, a photo-electric conversion layer which includes an amorphous silicon photo diode is formed on a light-transmissive or -reflective surface of an optical member of either the photo-taking optical system or the view-finder optical system of a camera. In other words, this patent application proposes to form such a photo-electric conversion layer on the surface of a reflex mirror of a view-finder optical system, or on a surface of a pentagonal roof type prism, or on a focusing screen. However, the proposed method does not solve the problem of the conventional device shown in FIGS. 1 and 2, because: The above-stated back incident light from the view-finder likewise comes to the photo-electric conversion layer to prevent accurate light measurement.

SUMMARY OF THE INVENTION

It is an object of this invention to provide a photometric device for a camera which is capable of minimizing the adverse effect of a back incident light coming from the view finder of the camera.

The above and further object and features of this invention will become apparent from the following detailed description of preferred embodiments thereof taken in connection with the accompanying drawings.

BRIEF DESCRIPTION OF THE DRAWINGS

FIGS. 18A, 18B and 18C are sectional views showing the advantageous effect attainable by the arrangement of the photo-electric conversion elements of FIG. 17.

DETAILED DESCRIPTION OF THE PREFERRED EMBODIEMENTS

Figure 1:
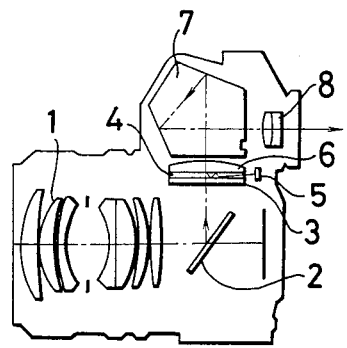
FIG. 1 is a sectional view showing the optical system of a conventional camera.
Figure 2:
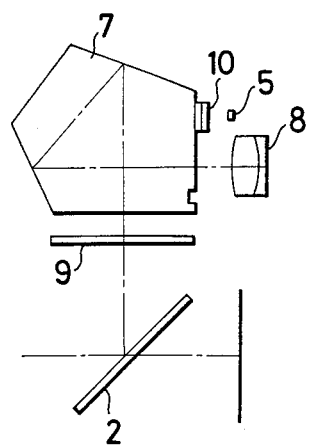
FIG. 2 is a sectional view of the optical system of another conventional camera.
Figure 3:
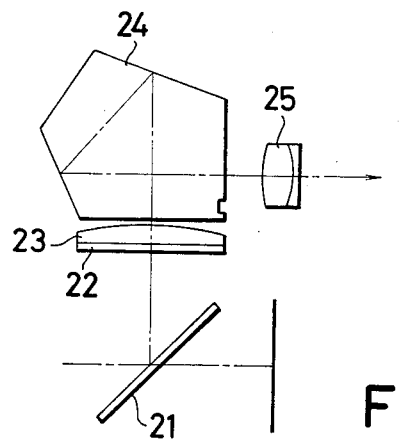
FIG. 3 is a sectional view of the optical system of a camera arranged according to the present invention as a first embodiment thereof.
Figure 4:
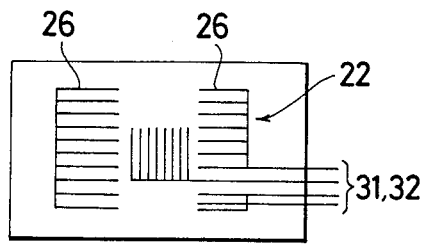
FIG. 4 is a plan view showing by way of example the planar arrangement of an array of photo-electric conversion elements employed in the first embodiment.
Figure 5:
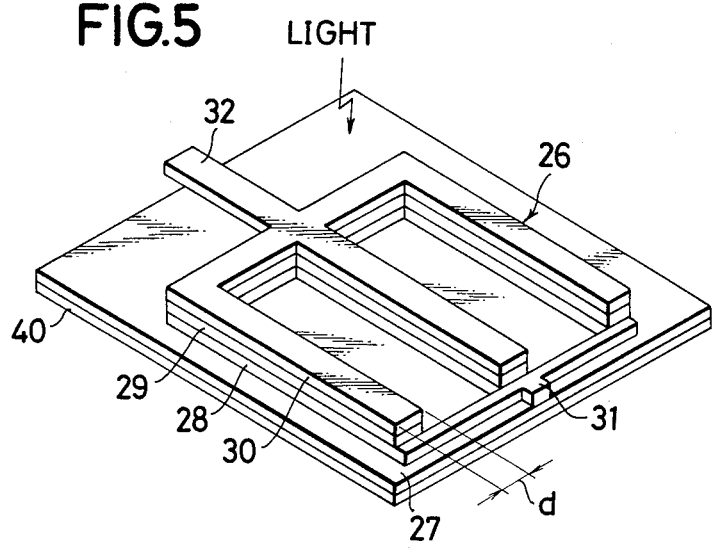
FIG. 5 is an enlarged oblique view of the same photo-electric conversion elements of the first embodiment of the invention shown in FIG. 4.

The following description deals with the details of arrangement of preferred embodiments of this invention with reference to FIG. 3 and other drawings subsequent thereto:

FIG. 3 is a sectional view showing the optical system of a camera arranged according to this invention as a first embodiment thereof. FIG. 4 is a plan view showing the planar arrangement of an array of photo-electric conversion elements employed in the first embodiment. FIG. 5 is an oblique view showing the structural arrangement of the photo-electric conversion elements. Referring to FIG. 3, a light flux coming from an object through a photo-taking lens which is not shown is reflected by a reflex mirror 21. The reflected light reaches an eyepiece 25 via an array 22 of photo-electric conversion elements arranged a little away from a focal plane, a condenser lens 23 disposed close thereto and a pentagonal roof type prism 24. The photo-electric conversion element array 22 consists of photo-electric conversion elements 26 which are arranged in a comb-like shape as shown in FIG. 4. The structural details of each of the photo-electric conversion elements 26 are as shown in FIG. 5. Referring to FIG. 5, an opaque lower electrode 28 is disposed on a glass plate 27. A photo-electric converter 29 is disposed on the lower electrode 28. A transparent upper electrode 30 is disposed on top of the photo-electric converter 29. These layer elements 28, 29 and 30 are formed in the same comb-like shape and are laminated one on top of another. The tooth part and the back part of the comb-like shape measure several μm in width "d" and are in a finely wiry state. Lead wires 31 and 32 are connected to the ends of the electrodes 28 and 30. The lower electrode 28, the photo-electric converter 29, the upper electrode 30 and the lead wires 31 and 32 are unified in one body. A plurality of the photo-electric converters 29 are arranged to be grouped into some number of blocks through combination of their comb tooth parts. Therefore, they can be arranged to meet the varied requirements of different photometric methods. With the lead wires 31 and 32 connected to applicable circuits, they can be switched either singly or in combination.

Use of CdS or amorphous silcon for the photo-electric converters would affect the visual field of the view finder as their transmittivity for visible rays is low. Whereas, since the width of the toothed parts of the photo-electric conversion elements 26 arranged according to this invention does not exceed several μm and is hardly discernible with the unaided eye, the arrangement does not bring about any adverse effect on the visual field of the view finder. Further, the CdS or amorphous silicon material can be vapor deposited onto a mother material such as the electrode 28 or 30. This facilitates preparation of the photo-electric conversion elements 26. Besides, since the patterns of the comb-like areas are freely shapable, a suitable photometric method can be selected as desired from among methods of varied kinds such as a center-emphasized photometric method, averaging photometric method, etc. However, the material to be used for the photo-electric converters 29 is not limited to CdS or amorphous silicon. They may be made of some other suitable material.

Figure 6:
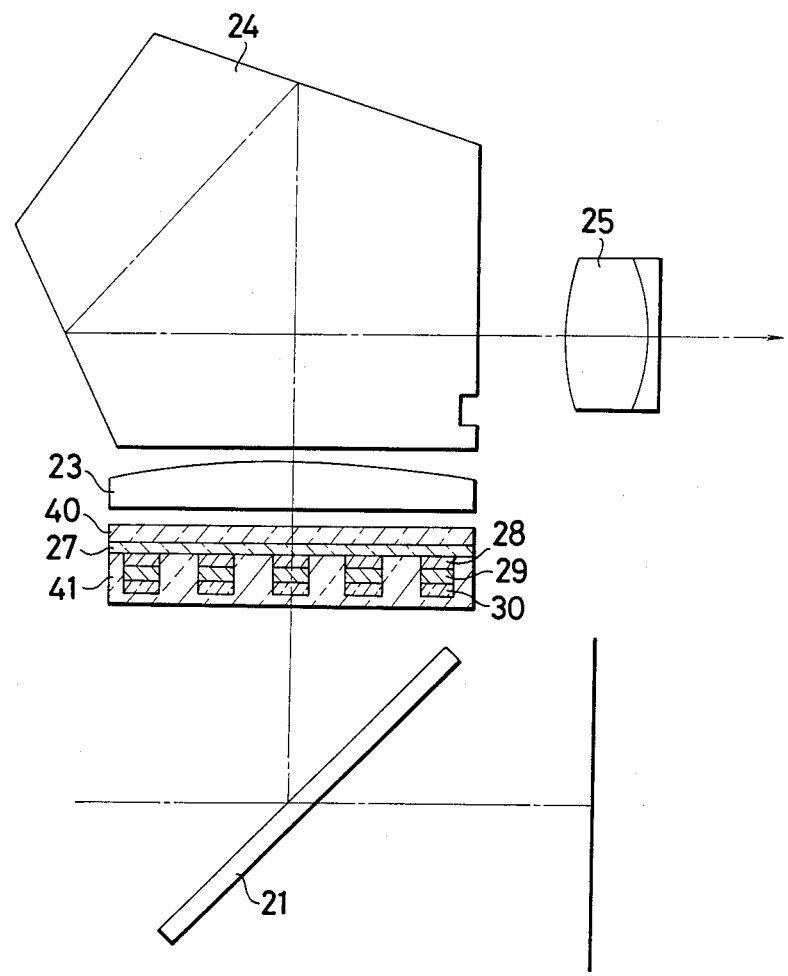
FIG. 6 is a sectional view showing the same optical system of the camera of FIG. 3 in an enlarged state.
Figure 7:
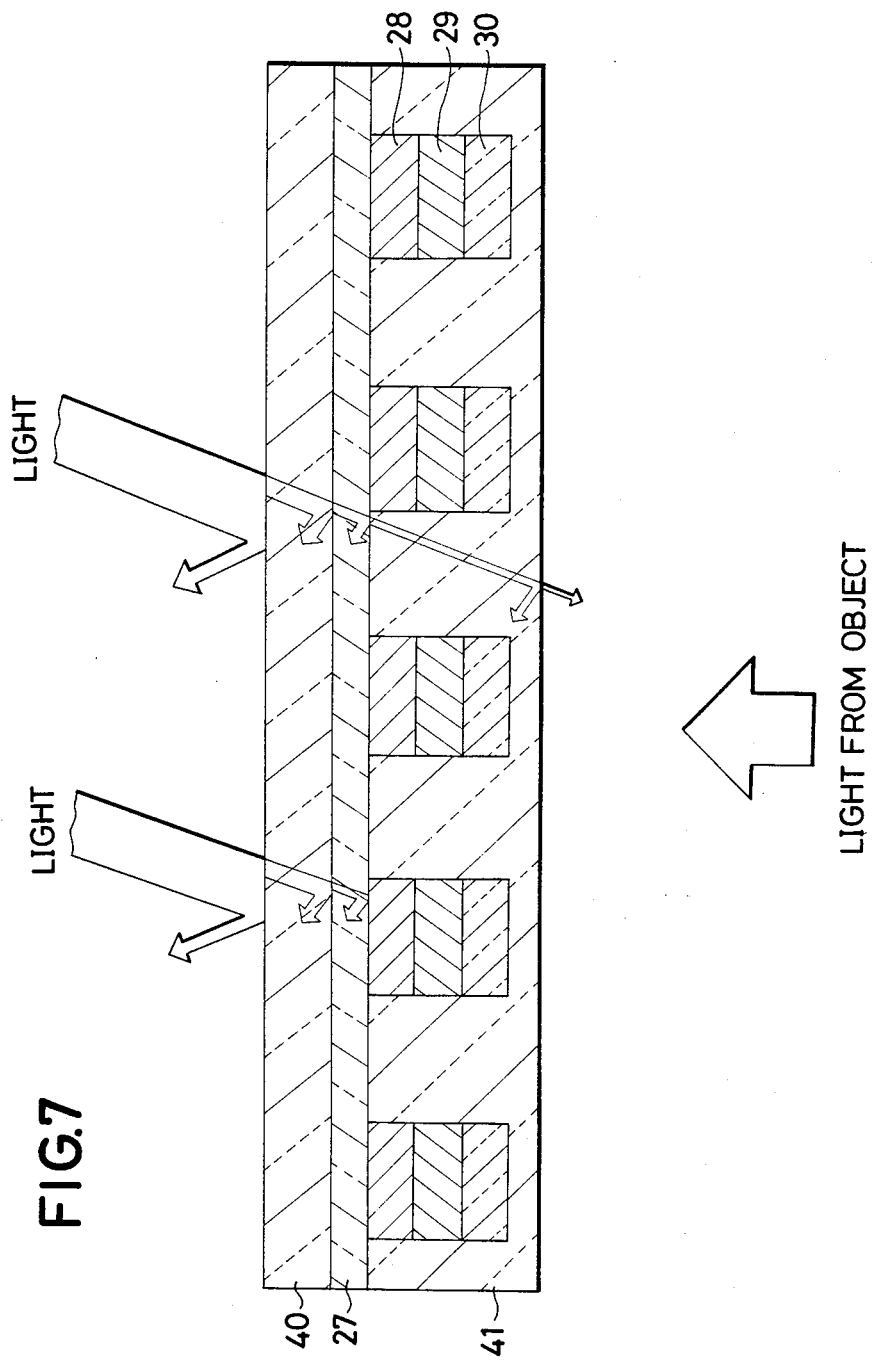
FIG. 7 is a further enlarged view showing the essential parts of FIG. 6.

Referring to FIG. 5, the object light coming via the photo-taking lens impinges on the photo-electric converters 29 through the transparent electrodes 30. The lower electrodes 28 are arranged to be opaque. Further, a transparent electrode 40 is disposed on one side of the glass substrate 27 opposite to the side on which the photo-electric conversion element 26 is disposed. The further details of this arrangement of the optical system are as shown in the enlarged sectional view of FIG. 6. FIG. 6 shows an example in which a protection layer 41 which is made of a transparent insulating material is provided for the purpose of protecting the photo-electric converters and the electrodes. With the embodiment arranged in this manner, the adverse effect of the back incident light from the view finder is prevented by virtue of the opaque electrodes 28. More specifically, the back incident light from the view finder passes through the lens 25, the pentagonal roof type prism 24 and the condenser lens 23 to impinge on and is diffused by a diffusing plate which is not shown but is disposed at the focal plane of the photo-taking lens. The diffused light resulting from this impinges on the transparent electrode 40. With indium tin oxide (ITO) used for this transparent electrode 40, the refractive index of the transparent electrode 40 is about 1.8, which is higher than that (about 1.5) of the glass substrate 27. Therefore, the most part of the diffused light is totally reflected without passing through the glass substrate 27. However, a portion of the light still leaks. With a portion of the diffused light thus allowed to pass through the glass substrate, a part of it impinges on the opaque electrode 28 to be reflected thereby. Another part of the diffused light passing through the glass substrate enters the transparent protection layer 41. Since the protection layer 41 is normally made of $SiO_2$ which is of the same refractive index as that of a glass sheet, the light is not totally reflected. A part of the light entered the protection layer 41 is allowed to pass through the lower surface thereof while another part of it is reflected by the lower surface. It is only this reflected light that comes via the transparent electrode 30 to the photo-electric converters 29. FIG. 7 shows this in a further enlarged view.

Figure 8:
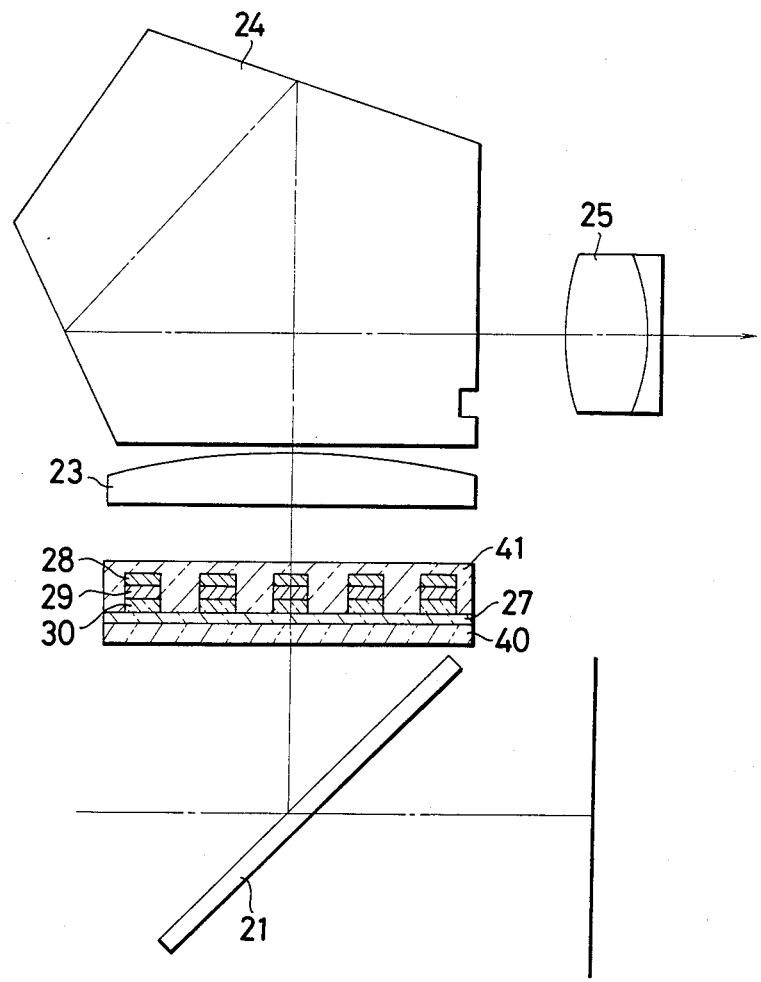
FIG. 8 is a sectional view showing the array of photo-electric conversion elements of FIG. 6 as in a state of being mounted in a different manner for the sake of facilitating the understanding of the advantageous effect of this invention.
Figure 9:
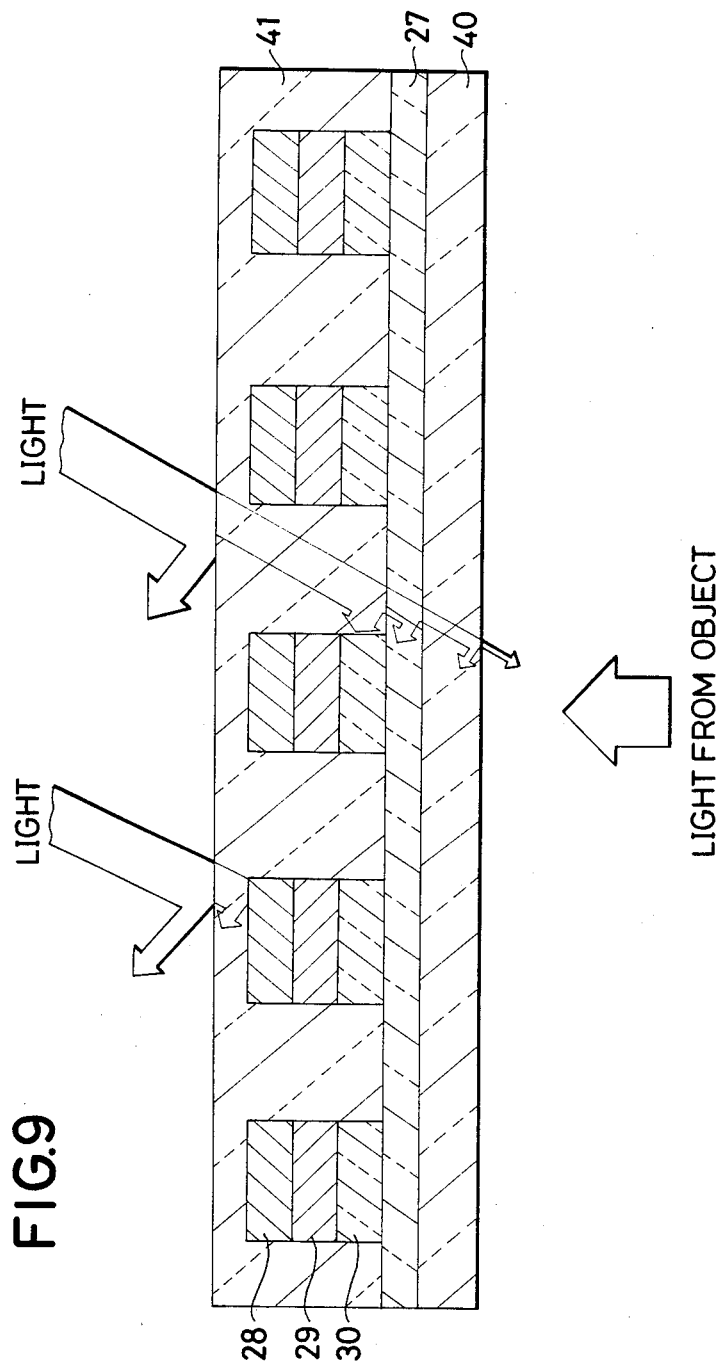
FIG. 9 is an enlarged view showing the details of FIG. 8.

FIG. 8 shows, for the sake of comparison, an example wherein the photometric array 22 of photo-electric conversion elements is disposed oppositely. In this instance, a portion of the light diffused by the diffusing plate in the same manner as mentioned in the foregoing is reflected by the opaque electrode 28. Then, a part of the reflected portion of light reaches the transparent electrode 30 to impinge on the photo-electric converters 29. In other words, the light which passes through the protection layer 41 and is reflected by the glass substrate 27 comes to the transparent electrode 30. Then, since the refractive index of the transparent electrode 30 is larger than that of the glass substrate 27, most of the incident light on the electrode 30 is totally reflected there to impinge on the photo-electric converters 29. The further details of this are as shown in FIG. 9.

Compared with the arrangement of FIG. 8, therefore, the arrangement of the embodiment shown in FIG. 6 is less vulnerable to the back incident light from the view finder.

Figure 10:
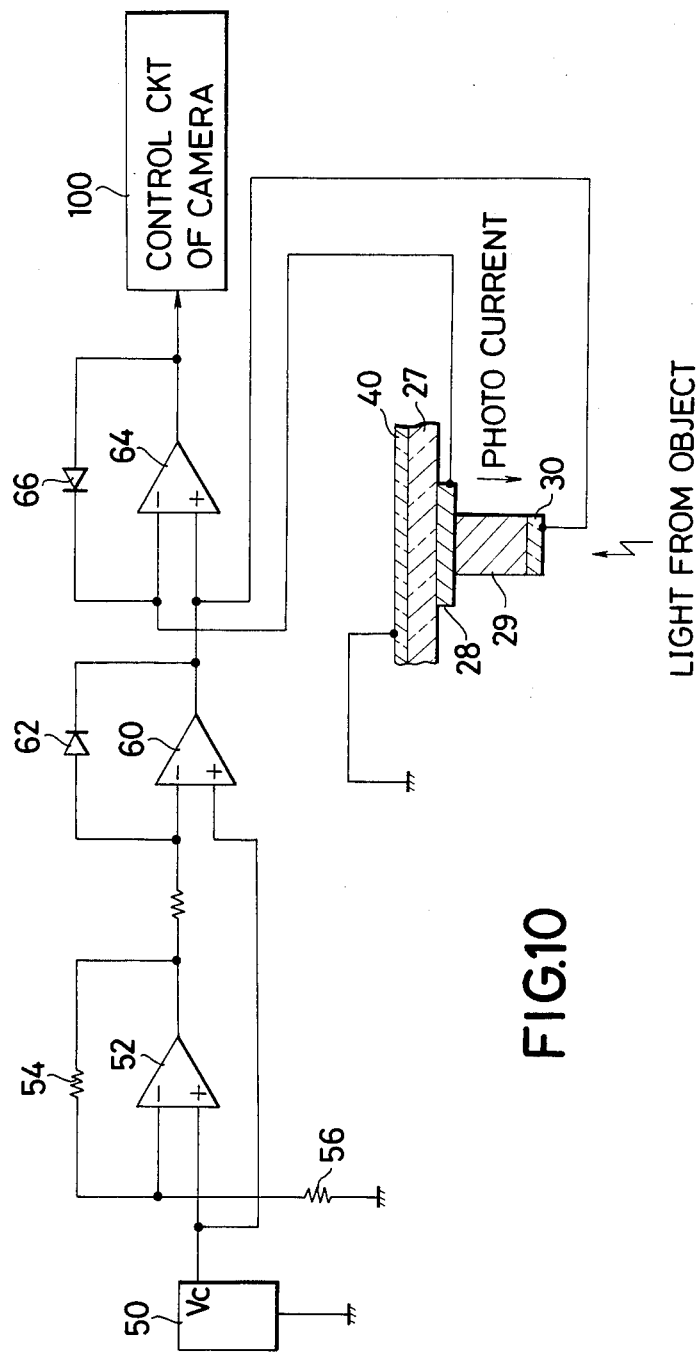
FIG. 10 is a circuit diagram showing circuit arrangement incorporating therein the array of photo-electric conversion elements shown in FIG. 6.

FIG. 10 shows a computing processing circuit arranged by incorporating the photo-electric conversion element array 22 of FIG. 6 into a photometric circuit which is provided with a temperature compensating function known from Japanese Utility Model Publication No. SHO 49-16812. The illustration includes a constant voltage source 50; operational amplifiers 52, 60 and 64; resistors 54 and 56 for adjustment; a temperature compensating diode 62; a diode 66 for logarithmic compression; and a control circuit of the camera. A temperature compensating operation is simplified by arranging the diodes 62 and 66 to have the same temperature characteristic and to be facing in opposite directions. The electrode 28 is connected to the negative terminal of the operational amplifier 64 while the other electrode 30 is connected to the positive terminal of the same amplifier 64. In the case of FIG. 10, an output signal from the low impedance side is arranged to be a reference voltage and the transparent electrode 40 is connected to the ground for the purpose of preventing any adverse effect of a noise.

Figure 11:
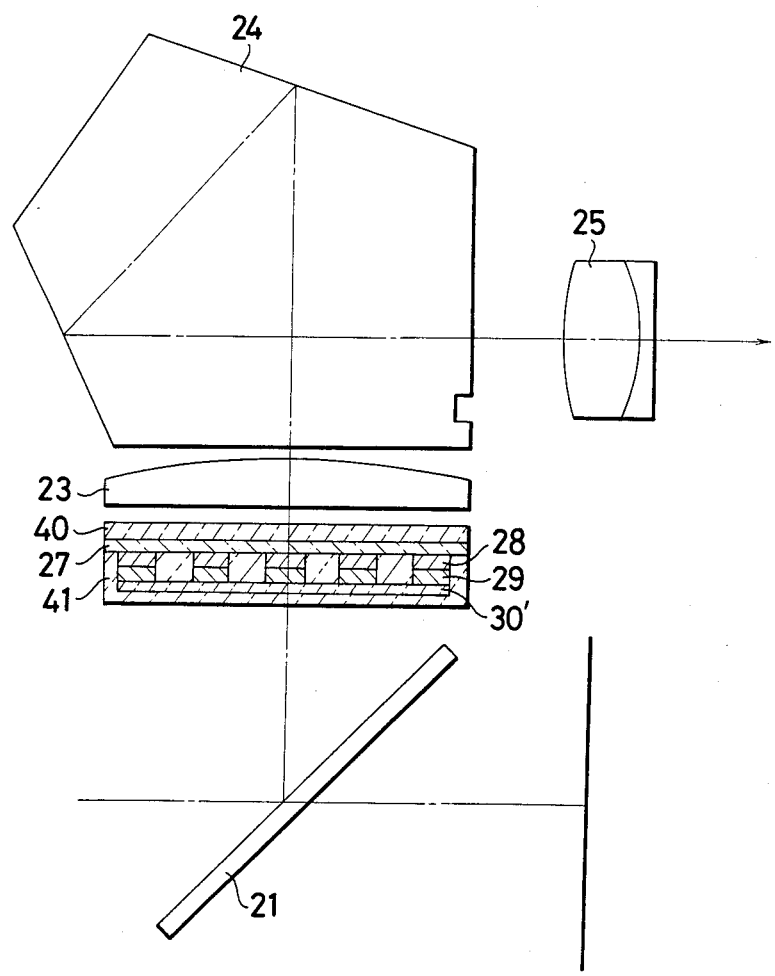
FIG. 11 is a sectional view showing the optical system of a camera which is arranged according to this invention as a second embodiment thereof.

FIG. 11 shows the optical system of a camera arranged as another embodiment of the invention. While the transparent electrode 30 is arranged as shown in FIGS. 6 and 7 in the foregoing embodiment, the embodiment shown in FIG. 11 has the transparent electrode 30 applied all over as a transparent electrode 30' in the same manner as the glass substrate 27. The transparent electrode 30' is disposed also on the side of the photo-taking lens in the same manner as in the case of the preceding example shown in FIGS. 6 and 7. With this arrangement, the back incident light from the view finder is likewise effectively prevented from coming to the photo-electric converters 29.

Figure 12:
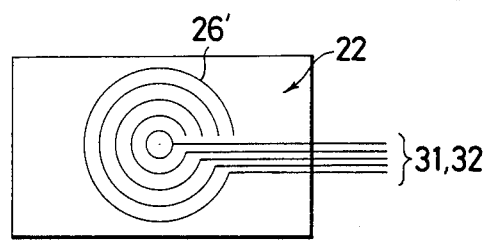
FIG. 12 is a plan view of the planar arrangement of photo-electric conversion elements which are employed in the second embodiment of the invention.

FIG. 12 shows a planar arrangement of photo-electric conversion elements as a further embodiment of this invention. In this case, the photo-electric conversion element array 22 is formed by forming photo-electric conversion elements 26' with the photo-electric converters 29 in circles.

Figure 13:
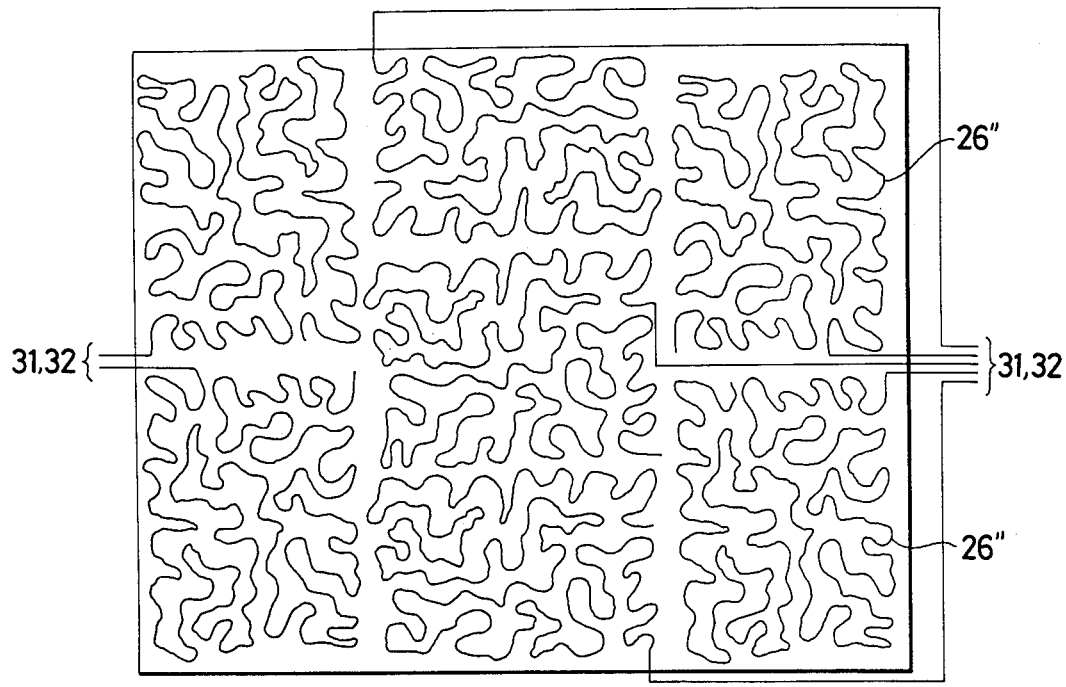
FIG. 13 is a plan view showing by way of example the planar arrangement of photo-electric conversion elements employed in a third embodiment of the invention.
Figure 14:
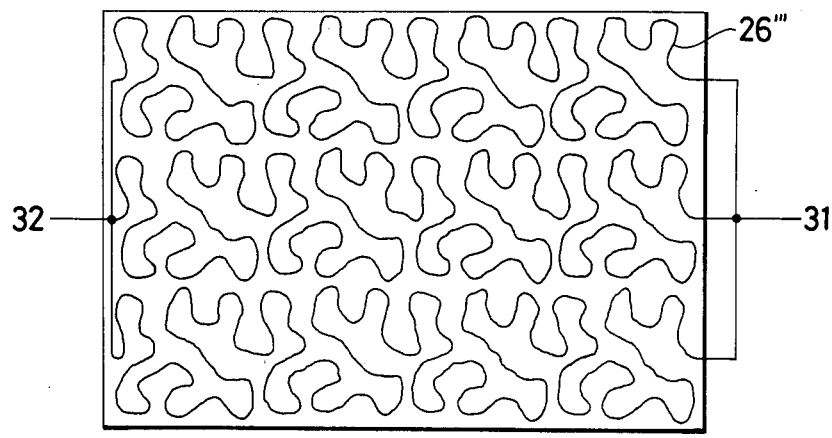
FIG. 14 is a plan view showing by way of example the planar arrangement of photo-electric conversion elements employed in a fourth embodiment of the invention.

FIG. 13 shows a planar arrangement of photo-electric conversion elements as a further embodiment of this invention. FIG. 14 also shows the planar arrangement of photo-electric conversion elements as a still further embodiment of the invention. Referring to FIGS. 13 and 14, photo-electric conversion elements 26" and 26''' are formed in irregular shapes, so that the problem of moire which tends to be caused by the pattern of a Fresnel lens included in the optical system of the view finder can be solved by the irregular shapes. The irregular patterns of the photo-electric conversion elements 26" and 26''' are divided into some number of blocks. These divided blocks can be arranged to meet the requirements of photometric methods of varied kinds. The terminals of the electrodes 28 and 30 of each of these divided blocks are provided with lead wires 31 and 32, so that they can be switched and operated either singly or in combination.

Figure 15:
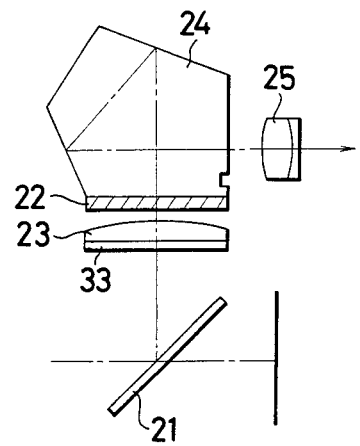
FIG. 15 is a sectional view showing the optical system of the camera arranged as the third embodiment of this invention.

FIG. 15 shows another optical system according to this invention. The optical system comprises, as viewed from the light flux incidence side thereof, in the order of a reflex mirror 21, a focusing screen 33, a condenser lens 23, a photo-electric conversion element array 22, a pentagonal roof type prism 24 and an eyepiece 25. The photo-electric conversion element array 22 which is arranged on the incidence surface of the pentagonal roof type prism 24 is deviating from the focal plane of the focusing screen 33 to a relatively long extent.

Figure 16:
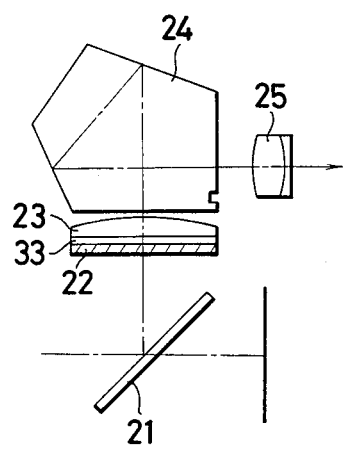
FIG. 16 is a sectional view showing the optical system of the camera arranged as the fourth embodiment of the invention.

FIG. 16 shows a further example of an optical system according to this invention. The optical system comprises in the order of a reflex mirror 21, a photo-electric conversion element array 22, a focusing screen 33, a condenser lens 23, a pentagonal roof type prism 24 and an eyepiece 25. The photo-electric conversion element array 22 which is disposed in front of the focusing screen 33 is arranged to be deviating from the focal plane of the focusing screen 33 to a smaller extent as compared with the optical system of FIG. 15.

The photometric element arrangement of the embodiment mentioned above includes in the order of, from the side of a photo-taking lens, a transparent electrode, a photo-electric converter, an opaque electrode and a transparent substrate. This arrangement almost completely eliminates the back incident light coming from the view finder to the photo-electric conversion element.

Figure 17:
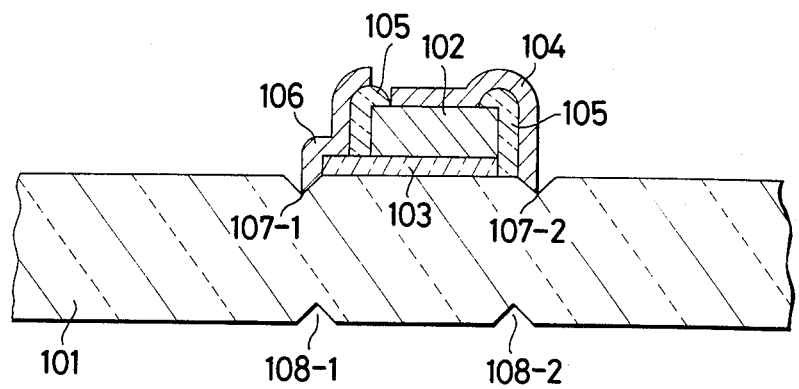
FIG. 17 is a sectional view showing an example of a structure of photo-electric conversion elements arranged according to this invention.

FIG. 17 shows another example of the photo-electric conversion element arranged according to this invention to lessen the adverse effect of the back incident light from the view finder. Referring to FIG. 17, a transparent glass substrate 101 has the photo-electric conversion element disposed thereon on the side of the view finder and is disposed in the neighborhood of the focal plane of the camera in the same manner as in the cases of FIGS. 3, 15 and 16. The illustration includes the photo-electric conversion element 102 which is made of an amorphous silicon or the like and is arranged to produce a photo current output between a transparent electrode 103 and a light insulating electrode 104 made of aluminum or the like. A transparent insulation layer 105 is arranged to prevent a leak from the side face of the amorphous silicon and also to prevent electric conduction between the transparent and light insulating electrodes 103 and 104. An aluminum electrode 106 is arranged to lower the resistance of the transparent electrode 103 and also to prevent back incident light from coming from a left upper part as viewed on the drawing. The glass substrate 101 is provided with grooves 107-1 and 107-2 which are formed on the view finder side of the substrate. Another pair of grooves 108-1 and 108-2 are formed in the glass substrate 101 on the other side of the substrate opposite to the view finder side. The latter pair of grooves 108-1 and 108-2 are arranged in inner positions than the former pair of grooves 107-1 and 107-2. Both the pairs of grooves 107-1, 107-2, 108-1 and 108-2 are disposed outside of the area corresponding to the above-stated photo-electric conversion element 102.

Figure 18A:
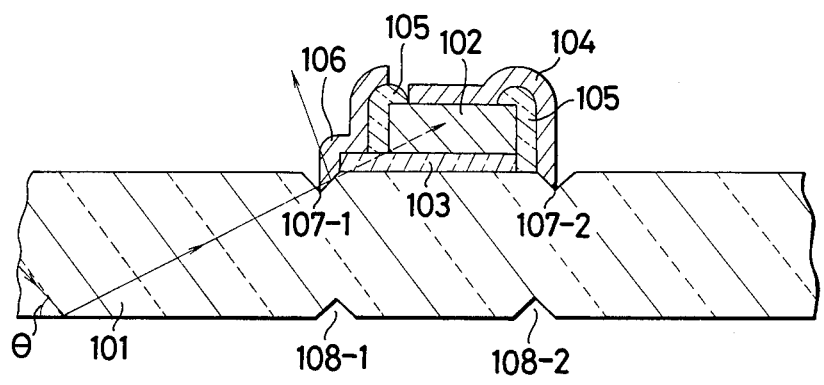

These grooves 107-1, 107-2, 108-1 and 108-2 prevent the back incident light coming from an upper part (as viewed on the drawing) to the photo-electric conversion element in the following manner: The back incident light comes from the view finder toward the photo-electric conversion element 102 after repeating inner surface reflection within the glass substrate 101 and would come into the element 102 as indicated by a broken line in FIG. 18A. FIG. 18A shows how this back incident light is prevented by the groove 107-1 from entering the photo-electric conversion element 102. The light is reflected by the right side face of the groove 107-1 as indicated by a full line and is thus prevented from keeping on coming straight into the photo-electric conversion element 102 as indicated by the broken line. Further, in the case of this embodiment, the same advantageous effect is attainable also with the groove part 107-1 arranged to be shielded from light by means of the light insulating electrode 104.

In the case of FIG. 18B, the back incident light is coming from the view finder onto the glass substrate 101 at an incident angle θ. The back incident light is then refracted by the upper surface of the glass substrate 101 to come into the substrate. The light is then reflected by the lower surface of the glass substrate 101. However, the groove part 108-1 then prevents the light from being reflected into the photo-electric conversion element 102. In other words, the back incident light from the view finder which is coming onto the glass substrate 101 at a small angle θ is refracted by one surface of the glass substrate 101. If there is no groove in the lower surface of the substrate as viewed on the drawing, inner surface reflection would cause the refracted light to reach the photo-electric conversion element 102 as indicated by a broken line in FIG. 18B. Whereas, the provision of the groove part 108-1 causes the refracted light to come to a boundary face between the glass substrate 101 and the exterior at a large angle close to perpendicularity and thus to allow it to go on straight to the outside as indicated by a full line, so that the refracted back incident light from the view finder can be prevented from being brought to the photo-electric conversion element due to inner surface reflection.

FIG. 18C shows that the arrangement of this embodiment of the invention permits adjustment of the sensitivity of the photo-electric conversion element 102 according to the incident angle of the light of an object which is incident on the surface of the glass substrate 101 opposite to another surface on the side of the view finder. In FIG. 18C, a reference numeral 110 denotes a ray of the object light which is coming at an undesirable incident angle toward the photo-electric conversion element 102. In the absence of the groove part 108-1, the undesirable ray 110 would reach the element 102 as indicated by a broken line. Whereas, with the groove part 108-1 arranged according to the invention, the undesirable ray is reflected by the left side face of the groove and is thus prevented from reaching the photo-electric conversion element 102.

Another reference numeral 111 denotes a ray of light incident on the photo-electric conversion element 102 at an acceptable angle. If the groove part 108-1 is not provided there, the ray 111 would not reach the photo-electric conversion element 102 as indicated by a broken line. With the groove part 108-1 provided there, however, the ray 111 is refracted when it comes to the right side face of the groove and is thus allowed to come to the photo-electric conversion element. With the groove parts 108-1 and 108-2 arranged in the glass substrate 101, therefore, the ratio of rays of light incident upon the photo-electric conversion element 102 can be changed according to the angle of the incident light.

In this embodiment, the glass substrate is employed as a transparent substrate. However, the glass substrate of course may be replaced with some other suitable transparent substrate.

Further, in the embodiment described, the groove parts 107-1, 107-2, 108-1 and 108-2 are formed in an acute angular shape in the areas of the transparent substrate outside of the area in which the photo-electric conversion element is disposed as shown in FIG. 17. The shape of these groove part, however, may be arranged to have a curved face instead of the acute angular shape illustrated.

In accordance with the arrangement of the embodiment described, the photo-electric conversion element is provided on the transparent substrate which is disposed in the neighborhood of the focal plane of the photo-taking lens. The camera is thus arranged to perform a photometric operation by means of the photo-electric conversion element. In this camera, the groove parts are provided in the parts of the transparent substrate located outside of the area of the substrate on which the photo-electric conversion element is disposed. This arrangement prevents the back incident light from the view finder from reaching the photo-electric conversion element with the incident light reflected by inner surface reflection which takes place within the transparent substrate. Further, with such groove parts also formed in the substrate on the side opposite to the side thereof facing the view finder, the ratio of light incident on the photo-electric conversion element can be adjusted according to the incident angle of the light on the element.

In accordance with this invention, the arrangement of the computing processing circuit is not limited to the arrangement shown in FIG. 10. The invention is of course applicable also to photometric computing circuits arranged in a manner different from the circuit arrangement shown in FIG. 10.

While amorphous silicon is used for the photo-electric conversion element in the embodiment described, the same advantageous effect is of course attainable by using some other suitable element, such as a light transmissive CdS.

As described in the foregoing, in accordance with this invention, a camera can be provided with a photometric device which is capable of minimizing the adverse effect of the back incident light from the view finder.

Further, in the embodiment described, the adverse effect of a noise can be eliminated by adding another electrode via an insulator on the outer side of one of the electrodes arranged for taking out the output signal of the photo-electric conversion element and by dropping the potential of the electrode to a ground level.

It is an advantageous feature of the embodiment that the photo-electric conversion elements are grouped into a plurality of blocks and these blocks facilitate selection of a desired photometric method by switching the combined use of them from one combination to another.

It is another feature of the embodiment that, since the photo-electric conversion element is made of a material permitting vapor deposition onto a mother material such as an electrode, the photometric device can be prepared at a low cost.

It is a further feature of the embodiment that the arrangement to have the photo-electric conversion element disposed in the neighborhood of the focal plane results in excellent linearity of the F-number obtained by the photometric operation. The arrangement also dispenses with a maximum F-number aperture correcting process.

It is a still further advantageous feature of the embodiment that the arrangement to have the photo-electric conversion element formed in an irregularly shaped pattern obviates the fear of having a moire due to the pattern of the Fresnel lens included in the view finder optical system.

What is claimed is:
1. A photometric device usable in a single lens reflex camera having a viewfinder system into which an ob- ject light from a photo-taking lens is introduced, comprising:

a photo-electric conversion element construction for measuring object light, said photo-electric conversion element construction comprising a transparent substrate and a photo-electric converter sandwiched between a transparent electrode and an opaque electrode laminated on the substrate, wherein said photo-electric conversion element construction is disposed in the optical path of said viewfinder system, and said transparent electrode, said photo-electric converter said opaque electrode and said transparent substrate are laminated in the recited order in the direction of incidence of the object light from said photo-taking lens.

2. A device according to claim 1, wherein said photo-electric conversion element construction is disposed at a position deviated from a focusing position of said viewfinder system.

3. A device according to claim 1, wherein said transparent electrode, said photo-electric converter and said opaque electrode are formed in a fine line.

4. A device according to claim 3, wherein said electrodes and photo-electric converters are arranged in the middle part of an object light region of said viewfinder system and around said middle part.

5. A device according to claim 3, wherein said electrodes and photo-electric converters are formed in a line not exceeding several $\mu m$.

6. A device according to claim 3, wherein said electrodes and photo-electric converters are arranged to extend into different areas of the region in the optical path of said viewfinder system in the form of a plurality of blocks.

7. A device according to claim 3, wherein said electrodes and photo-electric converters are formed in irregular shapes spreading all over the region of the optical path of said viewfinder system.

8. A device according to claim 1, wherein said photo-electric converter is made of an amorphous silicon material.

9. A photometric device usable in a single lens reflex camera having a viewfinder system into which an object light from a photo-taking lens is introduced, comprising:

a photo-electric conversion element construction for measuring object light, said photo-electric conversion element construction comprising a transparent optical member including a transparent substrate, and a photo-electric converter sandwiched between a transparent electrode and an opaque electrode laminated on said transparent optical member, wherein said photo-electric conversion element construction is disposed in the optical path of said viewfinder system, and said transparent electrode, said photo-electric converter, said opaque electrode and said transparent optical member are laminated in the recited order in the direction of incidence of said object light from the photo-taking lens.

10. A device according to claim 9, wherein said optical member has a region as large as the optical path of said object light and is composed of a glass substrate and a transparent electrode.

11. A device according to claim 9, wherein said electrodes and said photo-electric converter are protected by a transparent protection film.

12. A photometric device usable in a single lens reflex camera having a viewfinder system into which an object light of a photo-taking lens is introduced, comprising:

an electric conversion element construction for measuring object light, said construction comprising a transparent optical member and a photo-electric converter laminated on said transparent optical member, and being disposed in the optical path of said viewfinder system; and a plurality of grooves formed on both sides of said transparent optical member and located outside the region of said photo-electric converter.

13. A device according to claim 12, wherein said optical member is a transparent substrate.

14. A device according to claim 12, wherein said photo-electric converter is formed by an amorphous silicon material.

* * * * *